W. L. BLISS.
CAR LIGHTING SYSTEM.
APPLICATION FILED JAN. 7, 1913.
1,231,991.
Patented July 3, 1917.
2 SHEETS—SHEET 1.
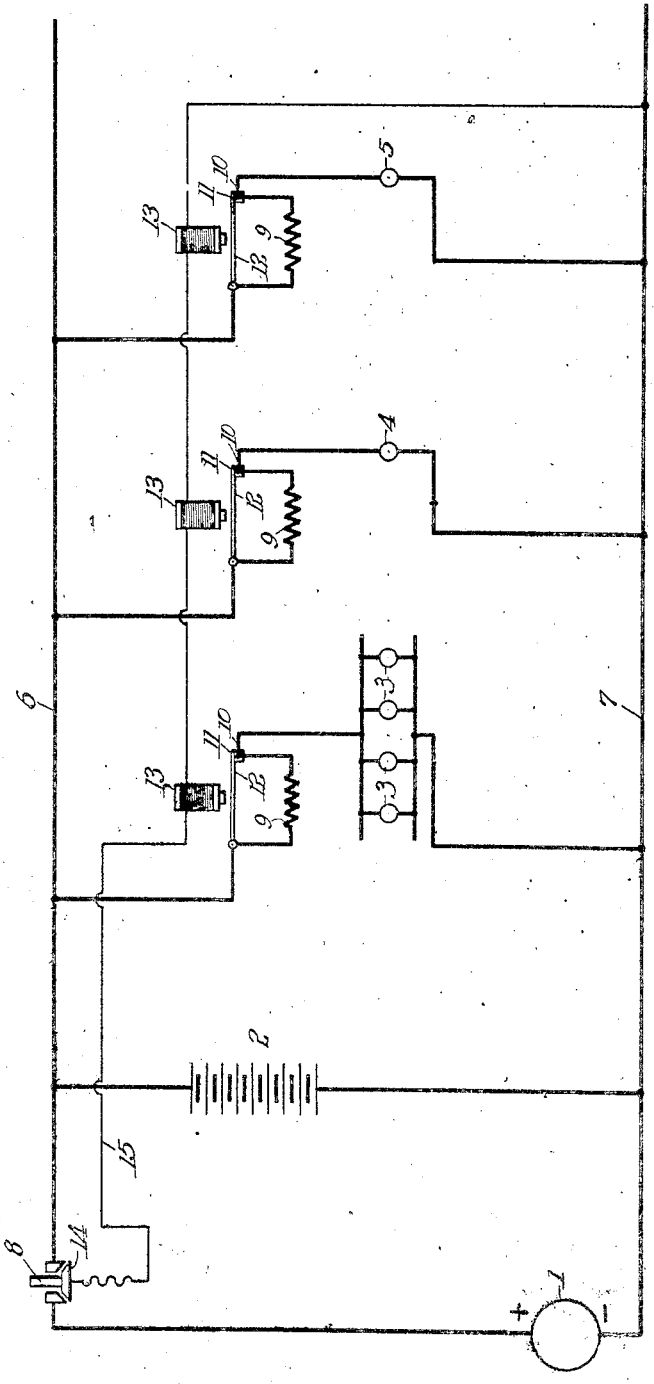
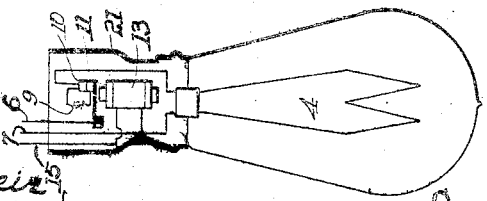
Witnesses:
Robert H. Wein
R. N. Van Nest
Inventor:
William L. Bliss
By Edwin B. H. Tower Jr. Atty.

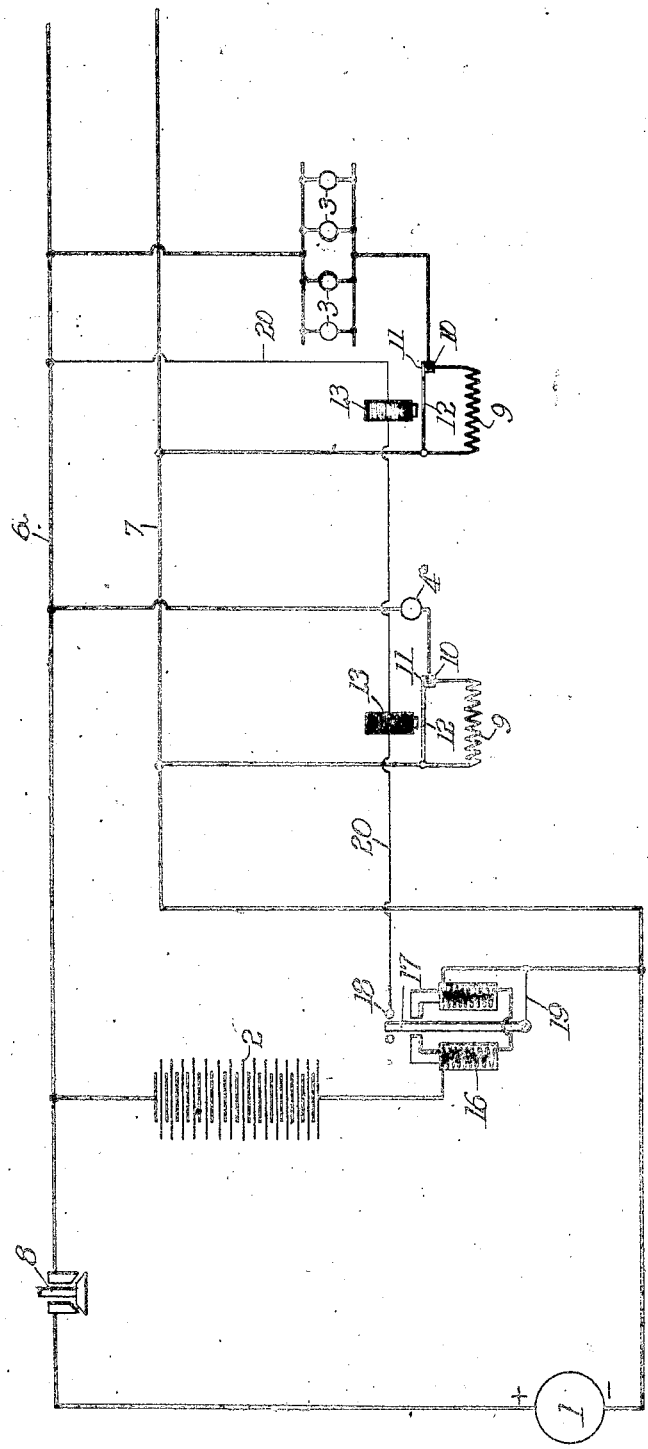

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

CAR-LIGHTING SYSTEM.

1,231,991.      Specification of Letters Patent.      Patented July 3, 1917.

Application filed January 7, 1913. Serial No. 740,579.

*To all whom it may concern:*

Be it known that I, WILLIAM L. BLISS, a citizen of the United States, residing at Niagara Falls, in the county of Niagara and State of New York, have invented new and useful Improvements in Car-Lighting Systems, of which the following is a full, clear, concise, and exact description, reference being had to the accompanying drawing, forming a part of this specification.

This invention relates to improvements in car lighting systems.

Car lighting systems generally employ, as the source of current, an axle driven generator and a storage battery which is charged by the generator when the generator voltage is sufficiently high and which supplies the lamps alone when the train is at rest or is running at a low speed. An automatic switch provides for connecting and disconnecting the generator and battery under predetermined conditions. This automatic switch is generally designed to connect the generator to the system when the generator voltage substantially equals the battery voltage. In such a system the voltage necessary to properly charge the battery is considerably higher than the voltage which the battery is able to supply to the lamps. Immediately after the automatic switch closes the voltage of the system rises abruptly as charging current begins to flow to the battery. Some regulating means must, therefore, be used to protect the lamps and to provide for uniform illumination regardless of whether the generator or the battery is supplying the current.

An object of the invention is to provide means for maintaining a normal voltage across each individual lamp or group of lamps regardless of whether the generator or battery is supplying the current.

Another object is to provide automatic means for compensating for rise in voltage of the system during the battery charging period.

Two forms which the invention may assume are illustrated in the accompanying drawings, in which:

Figure 1 illustrates diagrammatically one embodiment.

Fig. 2 illustrates diagrammatically a modified form.

Fig. 3 illustrates a detail.

Fig. 1 illustrates a generator 1, a storage battery 2, a lamp group 3 and individual lamps 4 and 5 arranged in parallel branches across the mains 6 and 7.

An automatic switch 8 of any preferred type is arranged in the generator lead 6 and is preferably designed to connect the generator to the system when the generator voltage is substantially equal to the battery voltage. As automatic switches operating in this manner are well-known the connections for the operating coils have been omitted.

A resistance 9 is arranged in series with each group of lamps or each individual lamp and each resistance 9 is normally short circuited by means of a fixed contact 10 and a movable contact 11 carried by pivoted lever 12. Coöperating with each lever 12 is an electro-magnet 13 which, when energized, is designed to raise the lever 12 and open the short circuit around its resistance 9, thereby inserting the resistance in series with the respective lamp circuit. Energization of the electro-magnets 13 may be controlled by the lamp switch which, when closed, completes a circuit by means of the bridging member 14 of the switch from main 6, through conductor 15 and the various electro-magnets in series to the main 7.

As the voltage of the system does not perceptibly rise until charging current begins to flow to the battery, a perceptible flicker in the lights may be caused by the insertion of the compensating resistance in advance of the voltage rise.

Fig. 2 illustrates an arrangement in which the energization of the electro-magnets 13 is controlled by the flow of charging current to the battery.

In this arrangement a polarized relay 16 is arranged in the battery circuit. As long as the battery is discharging or the generator voltage is too low to force current into the battery, current through the battery circuit will cause the polarized armature 17 of the relay to break contact between the armature and contact 18. Current flowing into the battery in a direction to charge the same will, however, cause the polarized armature to move to close contact between the lever and contact 18, thereby completing the circuit for the electro-magnets 13, through conductor 19, armature 17, contact 18 and conductor 20 to main 6.

When the invention is applied to individual lamps, as lamps 4 and 5, which may be berth lamps, the electro-magnets 13 and the resistance 9 for each lamp may conveniently be arranged within the lamp socket 21, as illustrated in Fig. 3.

By means of this invention the resistance in circuit is automatically regulated to the amount necessitated by the number of lamps in actual use and the introduction of the resistance is automatically accomplished when the automatic switch closes, as in Fig. 1, or when charging current begins to flow to the battery, as in Fig. 2.

The systems herein described are for the purposes of illustrating the invention, it being apparent, however, that many other arrangements and modifications may be made which fall within the scope of the invention which is defined in the appended claims.

What I claim as new and desire to secure by Letters Patent of the United States is:—

1. In a car-lighting system, in combination, a variable voltage generator, a storage battery and a plurality of lamp circuits connected across said generator in parallel branches, and means dependent solely upon the direction of current flow in the battery branch for controlling the resistance of each of the lamp branches.

2. In a car-lighting system, in combination, a variable voltage generator, a storage battery and a plurality of lamp circuits connected in parallel branches across said generator, each of said lamp circuits having electromagnetic means coöperating therewith to control the resistance thereof, and means in series in the battery branch responsive solely to the direction of current flow in said battery branch for controlling said electromagnetic means.

3. In a car-lighting system, in combination, a variable voltage generator, mains supplied thereby, a storage battery connected across said mains, a plurality of lamp circuits connected across said mains, each of said lamp circuits including a resistance, a plurality of electromagnetic devices connected in series, each of said electromagnetic devices being adapted to control the effectiveness of one of said resistances, and means responsive to the direction of current flow through said storage battery for connecting said electromagnetic devices across said mains.

4. In a car lighting system, a variable voltage generator, a storage battery intermittently charged thereby, independent groups of lamps supplied by said generator when the battery is being charged and by said battery alone when said generator is not charging said battery, a resistance in series with each group of lamps, an electromagnetic means associated with each resistance to control the effectiveness thereof, and a polarized relay in the battery circuit for controlling said electromagnetic means.

5. In a car lighting system, a variable voltage generator, a storage battery intermittently charged thereby, independent groups of lamps supplied by said generator when the battery is charging and by said battery alone when said generator is not charging said battery, a resistance in series with each group of lamps, means normally short circuiting each resistance, an electromagnet for controlling each short circuiting means, and a polarized relay in the battery circuit to cause the energization of said electro-magnets when current flows in a direction to charge the battery.

In witness whereof, I have hereunto subscribed my name in the presence of two witnesses.

WILLIAM L. BLISS.

Witnesses:
F. ZELLHOEFER,
A. J. WILMER.